Patented Mar. 2, 1943

2,312,916

UNITED STATES PATENT OFFICE 2,312,916

META-HYDROXYPHENYL-ETHANOLAMINE AND PROCESS OF MAKING THE SAME

Helmut Legerlotz, Paris, France, assignor, by mesne assignments, to Ciba Pharmaceutical Products, Incorporated, Summit, N. J., a corporation of New Jersey No Drawing. Application January 24, 1940, Serial No. 315,443. In France September 14, 1938

1 Claim. (Cl. 260—570.6)

A series of amines of the type of adrenaline has become known, for instance para-hydroxyphenylethanol - methylamine, para - hydroxyphenylethanolamine as well as meta-hydroxyphenylethanol-methylamine. The corresponding nor-compound of the last named substance, the meta - hydroxyphenylethanolamine has not hitherto been described in literature. This invention relates to the manufacture of primary meta-hydroxyphenylethanolamine by treating meta-hydroxy-ω-aminoacetophenone with a reducing agent, if desired after having blocked the hydroxy-group or amino-group respectively.

As reducing agent there may be used one suitable for converting a —CO— group into a —CHOH— group. It is shown for example in J. Houben, Die Methoden der Organischen Chemie, 3rd edition, vol. 2, chapter on Reduction, especially pages 245 and following that especially useful are the following reducing agents; hydrogen in the presence of a noble or a non-noble metal, for instance, palladium, platinum, nickel, cobalt or a mixture of any of these.

The desired blocking of the hydroxy- or aminogroup during the reduction may be effected by esterification. After the reduction the estergroup is then saponified and the free meta-hydroxyphenylethanolamine for example is obtained. Instead of the esterification any other kind of blocking may obviously be used; for example one may start from the benzylether and eliminate the benzyl radical subsequently to or in the course of the reduction.

The final products are useful in therapeutics. As compared with known compounds of similar constitution they have the advantage that their activity is considerably prolonged. For example an equally strong rise of blood pressure in rabbits under the same experimental conditions (intravenous application, $\frac{1}{10}$ lethal dose) has a duration of 9 minutes in the case of para-hydroxyphenylethanol-methylamine and a duration of 5–7 minutes in the case of meta-hydroxyphenylethanol-methylamine, as compared with the 27 minutes duration produced by the meta-hydroxyphenylethanolamine obtainable as described in the present process.

The further known para-hydroxyphenyl-ethanolamine has even a poorer activity on the blood pressure than tyramine (Heffter, Handbuch der experimentellen Pharmakologie, II/2, page 1288 [1924]) which latter itself has a poorer activity than para-hydroxyphenylethanol-methylamine.

Furthermore, the vaso-constricting minimal dose in the artificially perfused and isolated rabbit ear amounts to 0.5 γ in the case of para-hydroxyphenyl-ethanol-methylamine with a toxicity of 150 mg./kg. rabbit, to 0.05 γ in the case of meta-hydroxyphenyl - ethanol - methylamine with the high toxicity of 5 mg./kg. rabbit, and to 0.05 γ in the case of meta-hydroxyphenyl-ethanolamine with the toxicity of about 75 mg./kg. rabbit, that is to say, the last named new compound, with regard to its toxicity, is 5 times more active than the first named compound and 15 times more active than the second compound. Consequently, the new compound has surprisingly an essentially higher action on the blood pressure and vessels than comparable known compounds. In accordance with this proportion of activity also the local hemostatic effect of the new compound is increased as compared with the known products. This is particularly important for example when the compound is used as a hemostatic.

The following examples illustrate the invention, the parts being by weight:

Example 1

100 parts of the hydrochloride of meta-hydroxy-ω-amino-acetophenone of melting point 220–222° C. (obtainable by brominating meta-acetoxy-acetophenone, causing the bromo-ketone to react with sodium iodide, adding hexamethylenetetramine to the iodide in an indifferent solvent and scission of the addition product in acid solution) are shaken in aqueous solution with hydrogen in presence of 2 parts of palladium catalyst until 2 atomic proportions of hydrogen have been absorbed. The catalyst is now filtered and the filtrate evaporated in a vacuum; the crystalline and completely dry residue is dissolved in absolute alcohol and a precipitate is produced by adding dry ether. The hydrochloride of meta-hydroxyphenyl - ethanolamine thus obtained forms white crystals of melting point 159–160° C.

The compound thus obtained can be split into its optical antipodes in a manner known in itself.

Instead of from meta-hydroxy-ω-aminoacetophenone one may also start from meta-benzylhydroxy - ω - aminoacetophenone. The benzyl group is again eliminated either during or after the reduction.

Example 2

50 parts of meta-acetoxy-ω-acetaminoacetophenone obtained by acetylating the meta-hydroxy-ω-amino-acetophenone named in Example 1 are hydrogenated in ethyl acetate by means of hydrogen in presence of 10 parts of a nickel catalyst and in an autoclave under pressure at a raised temperature until two atomic proportions of hydrogen have been absorbed. After filtration from the catalyst the solution is evaporated. By recrystallizing the residue the meta - acetoxyphenyl - ethanolacetamine is obtained in pure form.

By heating this compound with for instance dilute hydrochloric acid there is obtained the meta-hydroxyphenyl-ethanolacetamine which by further saponification yields the compound described in Example 1.

Instead of from the acetates one may just as well start from other esters, for example from the benzoates.

What I claim is:

The meta-hydroxyphenyl-ethanolamine of the formula

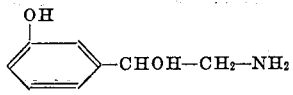

forming a hydrochloride of melting point 159° C. and having marked blood pressure and hemostatic properties.

HELMUT LEGERLOTZ.